United States Patent
Erb et al.

(10) Patent No.: US 8,876,198 B2
(45) Date of Patent: Nov. 4, 2014

(54) DEVICE AND METHOD FOR FASTENING, CLAMPING, OR ADJUSTING TWO COMPONENTS TO ONE ANOTHER

(75) Inventors: Thiemo Adolf Erb, Stuttgart (DE); Norbert Schwan, Rutesheim (DE); Ralf Habrik, Pfedelbach-Untersteinbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 932 days.

(21) Appl. No.: 13/029,225

(22) Filed: Feb. 17, 2011

(65) Prior Publication Data

US 2011/0133514 A1 Jun. 9, 2011

Related U.S. Application Data

(62) Division of application No. 12/125,607, filed on May 22, 2008, now abandoned.

(30) Foreign Application Priority Data

May 26, 2007 (DE) .......................... 10 2007 024 658

(51) Int. Cl.
 *B21D 53/88* (2006.01)
 *B62D 35/02* (2006.01)
(52) U.S. Cl.
 CPC ..................................... *B62D 35/02* (2013.01)
 USPC ............ 296/193.03; 296/187.08; 296/193.07; 29/897.2
(58) Field of Classification Search
 CPC ........ B62D 23/00; B62D 31/00; B62D 25/00; B62D 25/04; B62D 21/152; B21D 53/88

USPC .............. 29/897.2; 296/187.01, 1.08, 187.08, 296/193.01, 37.14, 187.12, 193.03, 193.07; 403/205
 See application file for complete search history.

(56) References Cited

U.S. PATENT DOCUMENTS

| 4,386,801 A | 6/1983 | Chapman et al. |
| 4,652,171 A | 3/1987 | Schutze |
| 5,542,230 A | 8/1996 | Schutze |
| 6,209,279 B1 | 4/2001 | Meier et al. |

FOREIGN PATENT DOCUMENTS

| DE | 3842402 | 4/1990 |
| DE | 10040673 | 2/2002 |
| DE | 20210880 | 11/2002 |
| EP | 0030122 | 6/1981 |
| FR | 2859448 | 3/2005 |
| GB | 2260961 | 5/1993 |
| WO | 9629483 | 9/1996 |

OTHER PUBLICATIONS

Nargess Shahmanesh—"Fastening Solutions for Automotive Underbody Shields"—Automotive Engineer, Professional Engineering Publishing, London, GB, Bd. 28, Nr. 4, 1. Apr. 2003.

*Primary Examiner* — Ryan J Walters
(74) *Attorney, Agent, or Firm* — Gerald E. Hespos; Michael J. Porco; Matthew T. Hespos

(57) ABSTRACT

A device and a method for fastening, clamping, or adjusting a molding part to a body-mounted part are provided. To allow the absorption of large tensile forces, a tensioning element designed as a tension strut is provided, which includes at least one oblong element made of fiber-reinforced plastic. The length of the tensioning element is adjustable between two end positions via a bracing device.

13 Claims, 4 Drawing Sheets

DEVICE AND METHOD FOR FASTENING, CLAMPING, OR ADJUSTING TWO COMPONENTS TO ONE ANOTHER

CROSS REFERENCE TO RELATED APPLICATION

This application is a divisional of U.S. patent application Ser. No. 12/125,607, filed May 22, 2008, which in turn claims the priority of German Application No. 10 2007 024 658.9, filed May 26, 2007, the disclosures of which are expressly incorporated by reference herein.

BACKGROUND AND SUMMARY OF THE INVENTION

The invention relates to a device and a method for fastening, clamping, or adjusting a molding part to a body-mounted part.

Fastening an underbody molding to the base support structure, for example, is known from automotive mass production. In particular, for sports cars or racecars, it is important that the underbody molding not move away from the base support structure as the result of wind forces. This is generally achieved by providing clamping elements which brace the underbody molding with respect to the base support structure.

Tension struts made of fiber-reinforced plastic are known from WO 96/029483, which include at least one looped bracing element or tensioning element for introducing a tensile force component.

There is needed a device and a method for fastening, clamping, or adjusting a molding part to a body-mounted part, by which large tensile forces are absorbed and which, at the same time, allow the molding part to be readjusted with respect to the body-mounted part.

According to the invention, a device for fastening, clamping, or adjusting a molding part, in particular an underbody molding, to a body-mounted part, in particular a side member, is provided. At least one tensioning element is designed as a tension strut and includes at least one oblong element made of fiber-reinforced plastic, whereby the length of the tensioning element may be adjusted between two end positions via a bracing device.

Further according to the invention, a method is provided for fastening, clamping or adjusting a molding part, in particular an underbody molding, to a body-mounted part, in particular a side member, by way of multiple tensioning elements designed as tension struts, each being fastened via a connecting element to the vehicle-mounted part, in particular the side member, and fastened via another connecting element to the molding part, in particular the underbody molding. The length of the tensioning elements are adjustable between two end positions by way of a bracing device.

Advantageous further embodiments are described and claimed herein.

An oblong element made of fiber-reinforced plastic allows large tensile forces to be absorbed, in particular at high speeds. At the same time, a length compensation device integrated into the tensioning element allows the length of the tensioning element to be adjusted, as the result of which the molding part may always be readjusted with respect to the body-mounted part. The forces occurring at high speeds may be absorbed by the oblong elements made of fiber composite and transmitted to the base support structure.

Other objects, advantages and novel features of the present invention will become apparent from the following detailed description when considered in conjunction with the accompanying drawings.

DETAILED DESCRIPTION OF THE DRAWINGS

Figure 1:
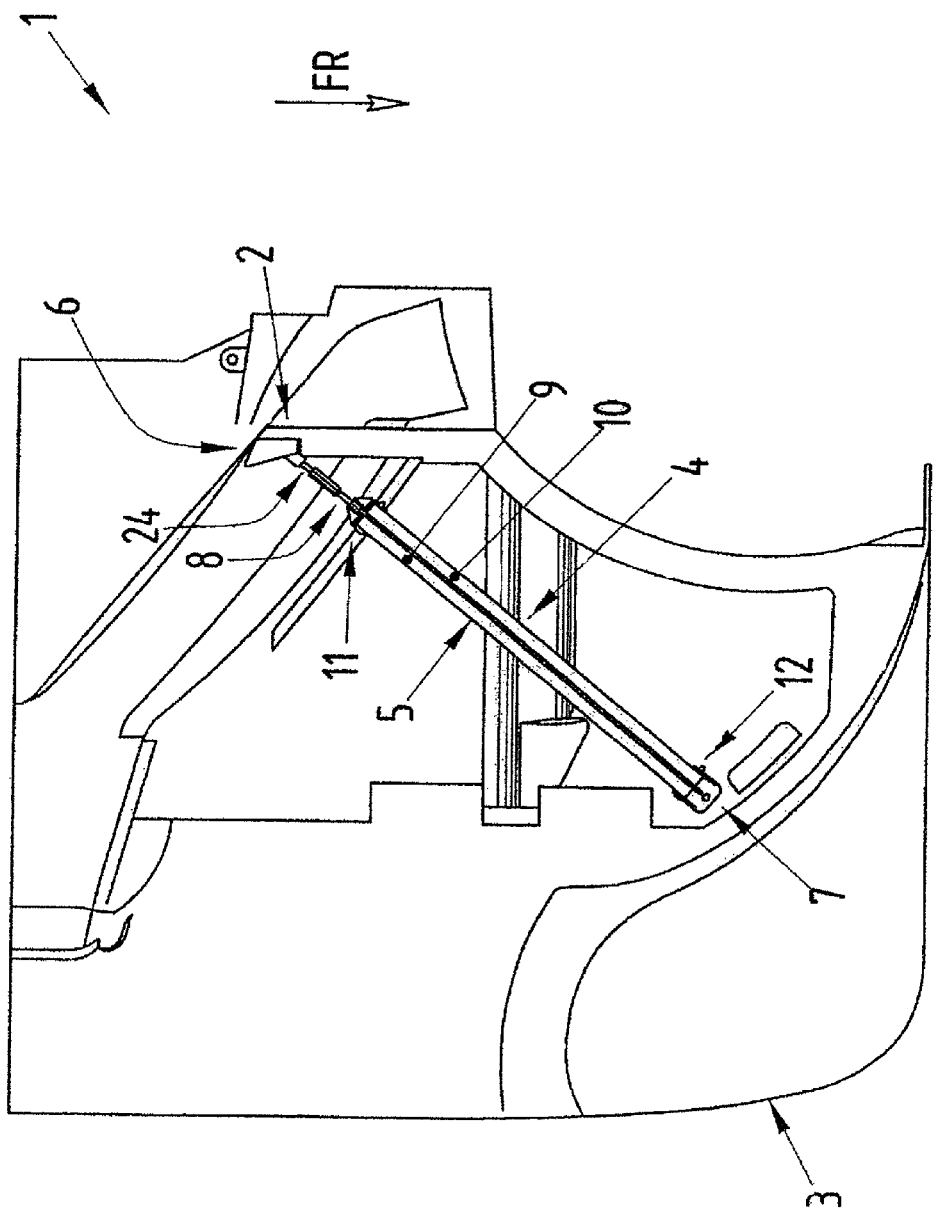
FIG. 1 is a perspective view of a base structure of a motor vehicle together with a tensioning element according to the invention.

FIG. 1 illustrates a base structure 1 of a motor vehicle (not further illustrated) in a perspective oblique view taken from above. The direction of travel is identified by an arrow FR. The base structure 1 includes a support structure, which in this illustration is represented as a side member 2. On its side facing the roadway, the base structure 1 is covered by an underbody molding 3, which is held on the support structure, in particular held flat against the side member 2. To prevent the underbody molding 3 from being pulled away from the support structure as the result of the increasing negative pressure at high speeds, there must be a stable attachment between the underbody molding 3 and the support structure. It is particularly important that this attachment may always be readjusted. This is achieved via a tension strut 4, which is designed as a tensioning element 5.

The tensioning element 5 includes two connecting elements 6 and 7. The connecting element associated with the side member 2 is fastened to the side member 2, and the connecting element 7 associated with the underbody molding 3 is fastened to the underbody 3.

The tensioning element 5 also includes a bracing element 8. Extending between the connecting elements 6 and 7 are two carbon fiber-reinforced plastic (CFK) bands 9 and 10, each of which is deflected at deflection points 11 and 12 so that the CFK bands have a double-layer circulating design in the manner of a loop.

Figure 2:
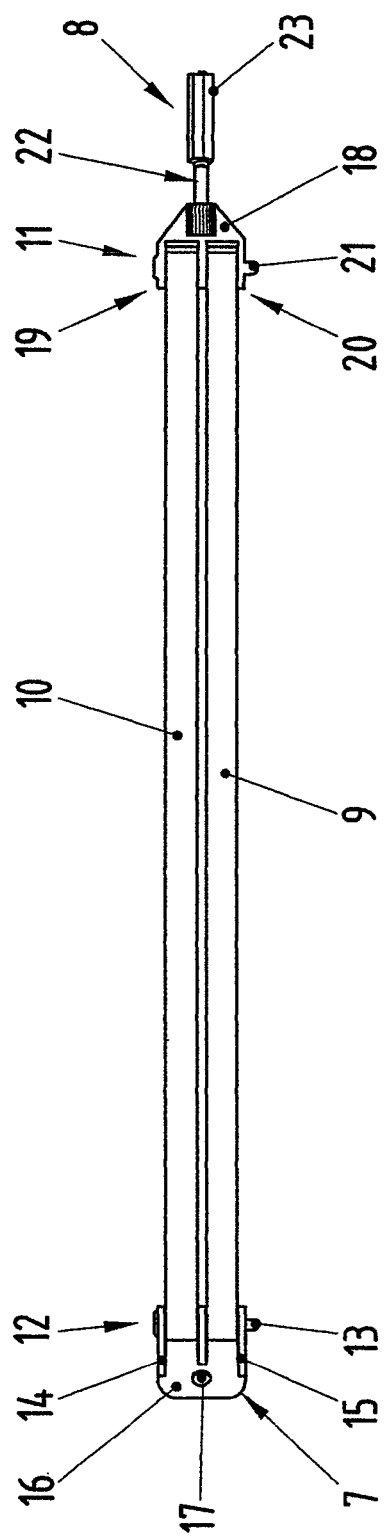
FIG. 2 shows the tensioning element according to FIG. 1 in an isolated illustration.

As shown in the detailed illustration in FIG. 2, at the connecting element 7, the deflection point 12 is provided with a reversing bolt 13 which is mounted in bearing receptacles 14 and 15. The CFK bands 9 and 10 lie against the periphery of the reversing bolt 13, at least in places. The bearing receptacles 14 and 15 are oriented at right angles to a base plate 16, which is anchored to the underbody molding 3 via a screw connection 17. The oppositely situated deflection point 11 is designed as a fork-shaped receptacle 18 having two prongs 19 and 20. The prongs 19, 20 accommodate a reversing bolt 21 around which the CFK bands 9 and 10 are guided.

A special feature is that the CFK bands 9 and 10 are rigidly designed as a molded part made of laminate, and therefore are not flexible.

The bracing element 8 is situated between the fork-shaped receptacle 18 and the connecting element 6. The bracing element 8 includes a threaded rod 22, which at one end is attached to the receptacle 18 and at the other end is guided in a threaded sleeve 23. The threaded sleeve 23 cooperates with a threaded rod 24 affixed to the connecting element 6 at the opposite end. By rotation of the threaded sleeve 23, the effective length of the tensioning element 5 may be shortened so that the underbody molding 3 is pulled toward the support structure, in particular the side member 2.

By using a plurality of such tensioning elements over the entire base structure, the underbody molding 3 may be optimally braced, and tolerances are compensated for. Forces produced from increasing negative pressure are absorbed by the tensioning elements, which act as tension struts.

Figure 3:
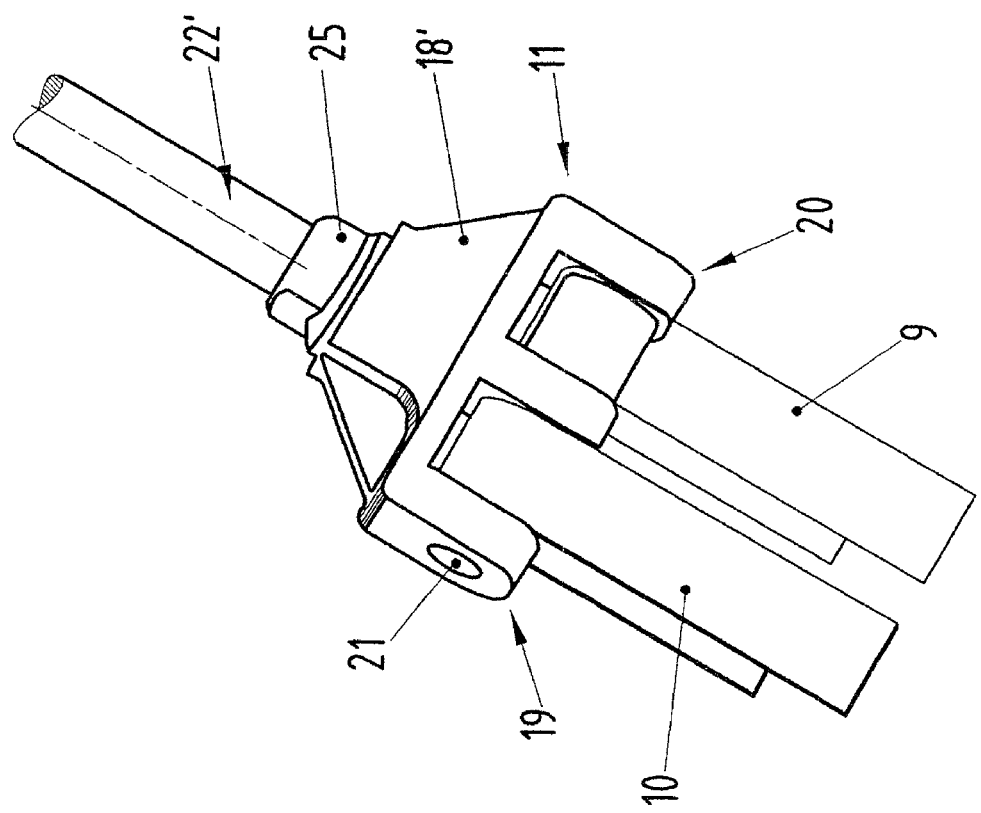
FIG. 3 is an enlarged illustration of the tensioning element according to FIG. 2 in a modified embodiment.

FIG. 3 shows a fork-shaped receptacle 18' in a design that is modified with respect to the receptacle 18 described in FIGS. 1 and 2. In the present case, the threaded rod 22' is screwed into the receptacle 18' and secured by a lock nut 25. The adjustment in length is made by screwing the threaded rod by a greater or lesser degree into the lock nut 25.

Figure 4:
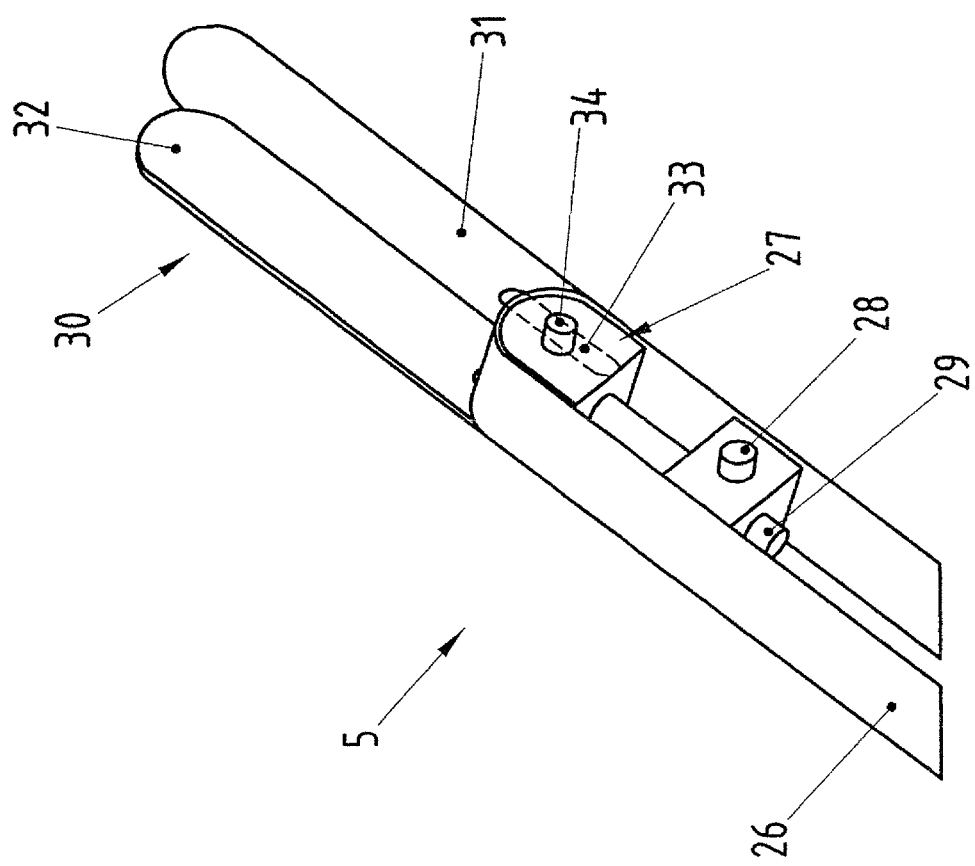
FIG. 4 shows a tensioning element in a second embodiment.

A second embodiment of the invention is shown in FIG. 4. The tensioning element 5 includes only one CFK band 26, which is guided around a deflection 27. Oppositely situated from the deflection 27 is a fastening pin 28, which is connected to the deflection 27 via a threaded rod 29. The fastening pin 28 is fixedly connected to a fork support 30, the two prongs 31 and 32 of which are fastened to the side member 2. Provided in each prong 31, 32 is an oblong hole 33 in which a pin 34 projecting from the deflection 27 engages.

The distance between the deflection 27 and the fastening pin 28 may be adjusted by way of the threaded rod 29, resulting in a compensation in length which corresponds to the length of the oblong hole 33.

It is understood as a matter of course that the CFK bands need not have a double-layer design, and instead may be fastened to the receptacle 18 or to the connecting element 7 via appropriate fastenings.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a base structure having at least one side member;
an underbody molding disposed to cover a side of the base structure facing a roadway on which the motor vehicle is supported;
at least one oblong element made of fiber-reinforced plastic and having opposite first and second ends;
a side member connecting element connecting the first end of the oblong element to the side member of the vehicle at a location spaced from the underbody molding;
an underbody molding connecting element mounted on the underbody molding of the vehicle at a location spaced from the side member; and
at least one bracing device defining a part of at least one of the side member connecting element and the underbody molding connecting element and being operatively configured to adjust a length between two end positions defined by a mounting position of the side member connecting element to the side member and the underbody molding connecting element to the underbody molding for preventing the underbody molding from moving away from the base support of the vehicle in response to wind forces.

2. The motor vehicle of claim 1, wherein the at least one oblong element is a CFK band.

3. The motor vehicle of claim 2, wherein the CFK band is rigid and made of a laminate.

4. The motor vehicle of claim 2, wherein the CFK band has a double-layer circulating design.

5. The motor vehicle of claim 4, further comprising a fork-shaped receptacle arranged at one end of the CFK band, wherein the CFK band is deflected at deflection points to form the circulating design, one deflection point being formed by the fork-shaped receptacle.

6. The motor vehicle of claim 4, wherein the CFK band is deflected at deflection points to form the circulating design, one deflection point being formed by a fastening pin connected to a deflection.

7. The motor vehicle of claim 1, wherein the bracing device is connected to the side member connecting element.

8. The motor vehicle of claim 1, wherein the oblong element is a CFK band defining a rigid continuous loop.

9. A motor vehicle, comprising:
a base structure having at least one side member;
an underbody molding disposed to cover a side of the base structure facing a roadway on which the motor vehicle is supported;
a side member connecting element secured to the side member at a location spaced from the underbody molding;
an underbody molding connecting element secured to the underbody molding at a location spaced from the side member; and
a tensioning element including at least one carbon fiber reinforced plastic band defining at least one loop, a first connection member passing through the loop and joined to the underbody molding connecting element and a second connection member passing through the loop and joined to the side member connecting element, at least one of the first and second connection members being adjustable for adjusting tension between the base structure and the underbody molding of the vehicle.

10. The motor vehicle of claim 9, wherein the first connection member includes a first reversing bolt passing through the loop, the underbody molding connecting element comprising a base plate connected to the underbody molding and two bearing receptacles projecting at right angles from the base plate, ends of the first reversing bolt projecting beyond the loop and being mounted respectively in the bearing receptacles.

11. The motor vehicle of claim 10, wherein the second connection member includes a second reversing bolt passing through the loop, a receptacle having two prongs engaged respectively with ends of the second reversing bolt projecting beyond the loop, a bracing element extending between the receptacle and the side member connecting element, the bracing element including a threaded rod connected to one of the receptacle and the side member connecting element and a threaded sleeve connected to the other of the receptacle and the side member connecting element, the threaded rod and the threaded sleeve being threadedly engaged with one another for adjusting tension between the base structure and the underbody molding.

12. The motor vehicle of claim 9, wherein the at least one loop comprises two substantially parallel loops.

13. The motor vehicle of claim 12, wherein the loops are rigid and formed from at least two laminated layers of carbon fiber-reinforced plastic.

* * * * *